(12) United States Patent
Barsness et al.

(10) Patent No.: US 9,998,436 B2
(45) Date of Patent: *Jun. 12, 2018

(54) MANAGEMENT OF ENCRYPTION WITHIN PROCESSING ELEMENTS

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/698,586

(22) Filed: Sep. 7, 2017

(65) Prior Publication Data

US 2017/0366522 A1    Dec. 21, 2017

Related U.S. Application Data

(63) Continuation of application No. 14/970,185, filed on Dec. 15, 2015.

(51) Int. Cl.
*H04L 29/06* (2006.01)
*H04L 9/14* (2006.01)
*G06F 17/30* (2006.01)

(52) U.S. Cl.
CPC ........ *H04L 63/06* (2013.01); *G06F 17/30516* (2013.01); *H04L 9/14* (2013.01)

(58) Field of Classification Search
USPC .......................................................... 726/27
See application file for complete search history.

(56) References Cited

U.S. PATENT DOCUMENTS

| 7,577,667 | B2  | 8/2009 | Hinshaw et al. |
| 8,677,505 | B2* | 3/2014 | Redlich ................. G06F 21/577 |
|           |     |        | 713/166 |
| 2001/0015919 | A1 | 8/2001 | Kean |

(Continued)

OTHER PUBLICATIONS

"Design and Analysis of Querying Encrypted Data in Relational Databases"; Canim et al; Department of Computer Science, The University of Texas at Dallas; 18 pages, 2008.*

(Continued)

*Primary Examiner* — Jason Lee
(74) *Attorney, Agent, or Firm* — Nathan M. Rau

(57) ABSTRACT

A streaming environment includes at least a first processing element of a first compute node and a second processing element of a second compute node. A tuple encryption operation is determined of the first processing element and the second processing element. The first processing element includes a first encryption key for encrypting the tuples as the leave the first processing element. An encryption workload is measured of the tuple encryption operation of a processing workload of the use of the first encryption key of a transfer of the stream of tuples. A threshold of the tuple encryption operation is determined. The second processing element is migrated to the first compute node and fused to the first compute node with the first processing element. The tuple encryption operation is removed from the first processing element.

1 Claim, 9 Drawing Sheets

(56) References Cited

U.S. PATENT DOCUMENTS

| | | | |
|---|---|---|---|
| 2002/0107804 A1* | 8/2002 | Kravitz | G06F 21/10 705/51 |
| 2004/0128553 A1 | 7/2004 | Buer et al. | |
| 2004/0148420 A1 | 7/2004 | Hinshaw et al. | |
| 2009/0006346 A1 | 1/2009 | C N et al. | |
| 2009/0216694 A1 | 8/2009 | Lang et al. | |
| 2011/0116185 A1 | 5/2011 | Katagiri et al. | |
| 2012/0004960 A1 | 1/2012 | Ma et al. | |
| 2012/0221767 A1* | 8/2012 | Post | G06F 13/1673 711/103 |
| 2013/0305034 A1 | 11/2013 | Branson et al. | |
| 2014/0164601 A1 | 6/2014 | Branson et al. | |
| 2014/0215165 A1 | 7/2014 | Branson et al. | |
| 2015/0095666 A1 | 4/2015 | Ananthakrishnan et al. | |
| 2016/0125118 A1 | 5/2016 | Chaudhuri et al. | |

OTHER PUBLICATIONS

Soosahabi et al., "Optimal Probabilistic Encryption for Secure Detection in Wireless Sensor Networks," IEEE Transactions on Information Forensics and Security, vol. 9, No. 3, Mar. 2014, pp. 375-385, © 2014 IEEE. DOI: 10.1109/TIFS.2014.2298813.

Soosahabi et al., "Scalable PHY-Layer Security for Distributed Detection in Wireless Sensor Networks," IEEE Transactions on Information Forensics and Security, vol. 7, No. 4, Aug. 2012, pp. 1118-1126, © IEEE. DOI: 10.1109/TIFS.2012.2194704.

Canim et al., "Design and Analysis of Querying Encrypted Data in Relational Databases," IFIP WG 11.3 Conference on Database and Applications Security, 2007, pp. 1-18, Department of Computer Science, The University of Texas at Dallas.

Barsness et al., "Management of Encryption Within Processing Elements," U.S. Appl. No. 14/970,185, filed Dec. 15, 2015.

Barsness et al., "Management of Encryption Within Processing Elements," U.S. Appl. No. 15/099,271, filed Apr. 14, 2016.

Accelerated Examination Support Document for U.S. Appl. No. 15/099,271, dated Apr. 7, 2016, 13 pages.

Barsness et al., "Management of Encryption Within Processing Elements," U.S. Appl. No. 15/698,592, filed Sep. 7, 2017.

List of IBM Patents or Patent Applications Treated as Related, signed Sep. 7, 2017, 2 pages.

Barnes, R., Internet Society Requests for Comment (RFCs), "Use Cases and Requirements for JSON Object Signing and Encryption (JOSE) (RFC7165)," IP.com Prior Art Database Technical Disclosure, IP.com No. 000236247, Original Publication: Apr. 1, 2014, Electronic Publication: Apr. 16, 2014, 51 pages. http://null/IPCOM/000236247.

* cited by examiner

MANAGEMENT OF ENCRYPTION WITHIN PROCESSING ELEMENTS

BACKGROUND

This disclosure generally relates to stream computing, and relates in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product may determine an optimization of a streaming environment by fusing processing elements and operators to reduce an encryption overhead. The optimization of the streaming environment may include fusing processing elements within an operator graph to reduce encryption/decryption workloads within the streaming environment.

One embodiment is directed towards a method for managing a tuple encryption operation within a streaming environment. The streaming environment includes at least a first processing element of a first compute node and a second processing element of a second compute node. The first and second processing elements perform one or more operations upon tuples as the tuples pass through the operator graph. A tuple encryption operation is determined of the first processing element and the second processing element. The first processing element includes a first encryption key for encrypting the tuples as the tuples leave the first processing element. An encryption workload is measured of the tuple encryption operation of a processing workload of the use of the first encryption key of a transfer of the stream of tuples between the first compute node and the second compute node including a tuple decryption operation of the first encryption key at the second compute node. A threshold of the tuple encryption operation is determined. The second processing element is migrated to the first compute node and fused to the first compute node with the first processing element. The tuple encryption operation is removed from the first processing element.

Another embodiment is directed towards a system for managing a tuple encryption operation within a streaming environment. The streaming environment including at least a first processing element of a first compute node and a second processing element of a second compute node, the first processing element and second processing element are configured to process a stream of tuples. The system includes a memory, a processor device communicatively coupled to the memory, and an encryption manager communicatively coupled to the memory, and the processor device. The encryption manager is configured to determine that a tuple encryption operation is present in the first processing element during a transfer of the stream of tuples from the first processing element to the second processing element. The encryption manager is configured to measure an encryption workload of the tuple encryption operation, the encryption workload including a processing load of the tuple encryption operation on the transfer of the stream of tuples between the first processing element and the second processing element. The encryption manager is configured to determine that an encryption workload threshold of the processing load of the tuple encryption operation is met. The encryption manager is configured to fuse, in response to the encryption workload threshold being met, the first processing element and the second processing element by migrating the second processing element to the first compute node. The encryption manager is configured to remove the tuple encryption operation from the first processing element.

Yet another embodiment is directed towards a computer program product for managing a tuple encryption operation within a streaming environment. The streaming environment includes at least a first processing element of a first compute node and a second processing element of a second compute node. The first processing element and second processing element are configured to process a stream of tuples. The computer program product includes a computer readable storage medium having a computer readable program stored therein; the computer readable program is executed on a computing device. The computing device is configured to determine that a tuple encryption operation is present in the first processing element during a transfer of the stream of tuples from the first processing element to the second processing element. The computing device is configured to measure an encryption workload of the tuple encryption operation, the encryption workload including a processing load of the tuple encryption operation on the transfer of the stream of tuples between the first processing element and the second processing element. The computing device is configured to determine that an encryption workload threshold of the processing load of the tuple encryption operation is met. The computing device is configured to fuse, in response to the encryption workload threshold being met, the first processing element and the second processing element by migrating the second processing element to the first compute node. The computing device is configured to remove the tuple encryption operation from the first processing element.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
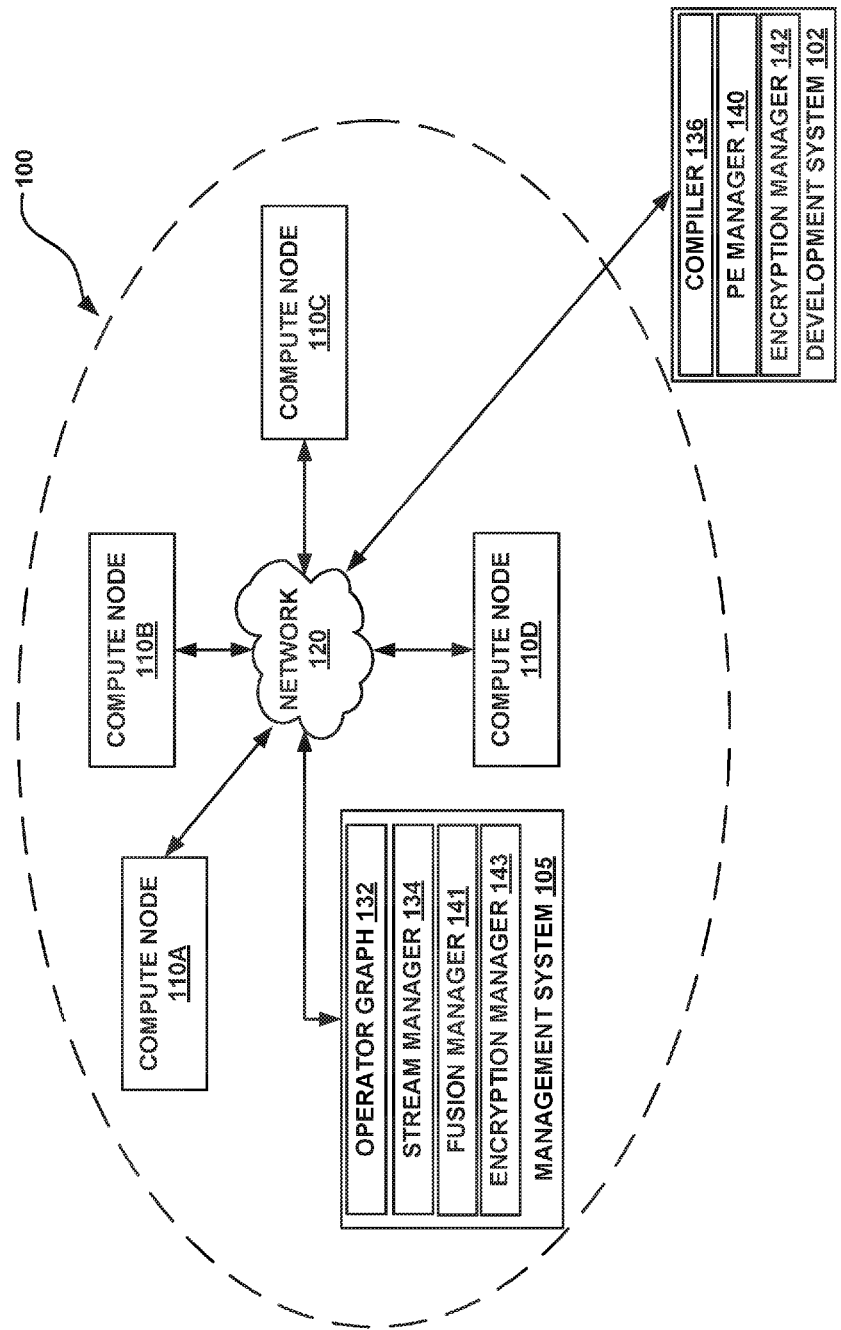
FIG. 1 illustrates a computing infrastructure configured to execute a stream computing application, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a streaming environment, and more particular aspects relate to runtime fusion of two or more processing elements. The runtime fusion of the one or more processing elements may include measuring an encryption/decryption workload on compute nodes hosting the one or more processing elements. The encryption/decryption workload may include a threshold of the workload for determining a condition for fusion. One or more processing elements may be migrated to another compute node and fused to reduce the encryption/decryption workload of a compute node. While the present disclosure is not necessarily limited to such applications, various aspects of the disclosure may be appreciated through a discussion of various examples using this context.

Stream-based computing and stream-based database computing are emerging as a developing technology for database systems. Products are available that allow users to create applications that process and query streaming data before it reaches a database file. With this emerging technology, users may specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application may be fused together to form a processing element that is executable. Doing so allows processing elements to share a common process space, resulting in much faster communication between stream operators than is available using inter-process communication techniques (e.g., using a TCP/IP socket). Further, processing elements may be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

A compute node may include a computer processor. The computer processor may operate along with one or more other computer processors, forming a grouping. The grouping of two or more computer processors may be termed as a cluster, e.g., a server containing one or more computer processors, on which the streaming environment operates.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, may be changed by the stream operator, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple, except one, are the same as the attributes of the input tuple.

Generally, a particular tuple output by a stream operator or processing element may not be considered to be the same tuple as a corresponding input tuple even if the input tuple is not changed by the processing element. However, the run environment of the present description and the claims, may include an output tuple that has the same data attributes or is associated with the same entity as a corresponding input tuple which will be referred to herein as the same tuple unless the context or an express statement indicates otherwise.

Streaming environments may include a distributed programming paradigm where an application may be split up into pieces. The pieces of the application may be distributed across a series of processing elements. The series of processing elements may run on one or more computer processors within a cluster of the streaming environment. The processing elements may be connected together by sending streams of data or tuples into and out of an initial processing element to a subsequent processing element. The stream may include a series of tuples each of which may have attributes. The tuples may enter the processing elements one tuple at a time. Contracts may exist between processing elements to which processing elements who sends the tuples and which processing elements receive tuples. The stream of tuples may be introduced continuously, (i.e. never ending) the processes main thread code may include a call back routine that executes when tuples arrive at any of the incoming ports.

The processing elements of the streaming environment may include a plurality of operators configured to perform various tasks upon the tuples. The plurality of operators may be grouped together to form a processing element that performs the task as a whole using the plurality of operators. Alone, an operator may perform a single task upon a tuple, whereas if the operators are grouped together, multiple tasks may be completed by a single processing element in tandem. For example, two operators may operate within a single processing element. The two operators may perform two tasks or operations upon the tuple simultaneously while the tuple is within the single processing element.

Operator graphs may include one or more processing elements aligned to perform a function upon one or more tuples as the tuples pass through the stream environment. Operator graphs may be basic or complex. Basic operator graphs may include a few operators configured to perform a simple task. For example, a basic operator graph may include three processing elements. The three processing elements may include a source, a functor, and a sink. The source may input tuples into the stream, the functor may perform an operation upon the tuples sent from the source, and the sink may output the tuples from the stream. The source may read external data from a file or socket using a uniform resource identifier (URI). For example, the source may read external data from a first disk and pass the data in a form of tuples read from the disk to the functor. The functor may perform a manipulation or transformation operation, where an attribute of a tuple may be changed. The functor may be a processing element. The processing element may perform an operation upon the tuple, described further herein. The sink may intake the tuple, write the tuple, and externalize the tuple onto a desired output formant. For example, the sink may write the tuple to a disk, the tuple may include the data transformed by the functor. The data may be externalized and displayed on a graphical user interface (GUI) observable by an end user.

Operator graphs may also be complex. Complex operator graphs may include one or more processing elements, operating on one or more tuples, within the streaming environment. For example, the operator graph may include a split operator. The split operator may copy the tuples to run the split tuples in tandem within separate processing elements. For example, a first tuple is split into a first tuple and a copy of the first tuple. The first tuple may enter a first set of one or more processing elements within the operator graph, and the copy of the first tuple may enter a second set of one or more processing elements within the operator graph. The first set of one or more processing elements may perform a first set of operations upon the first tuple, while the second set of one or more processing elements may perform a second set of operations upon the copy of the first tuple.

Each operator may turn into a processing element and may include a separate process compared to other operators. Having each operator operate upon individual processing elements may spread out the workload, using one or more computer processors, within the streaming environment. The one or more computer processors may operate within a cluster of computer processors that are configured to run the streaming environment. The processing elements including a single operator may not utilize available processing power within the computer processor depending upon the operator and the computer processor utilized by the operator. To increase the efficiency of the processing power available within the cluster of computer processors, operators may be fused alongside other operators within a single processing element.

Operators may include code that instructs the operators to perform actions upon tuples as they pass though the operators. The code may be written using a particular programming language to create program instructions for the operators. The operators may be combined into processing elements that use the computers processors of the streaming environment to perform the operations upon the tuples. One or more operators may be programmed or grouped to a single processing element, causing a single processing element to be able to perform multiple tasks or operations. To process the tuples, the one or more processing elements require processing power of the one or more computer processors of the cluster. If the one or more operators do not require all of the processing power available from a computer processor, then additional operators may be fused to the processing element. Fusing an additional operator to a processing element may better utilize the processing power of the computer processor.

The tuples entering and exiting the processing elements of the stream environment may require encryption during the transfer of tuples between processing elements. The stream environment may include multiple compute nodes wherein each compute node includes one or more processing elements. The encryption of the tuples may include encrypting tuples as they leave an initial processing element, and decrypting tuples as they enter a subsequent processing element. The initial processing element in charge of encrypting tuples may include a tuple encryption operation (e.g., an encryption operation or encryption instructions), which instructs the initial processing element to encrypt the tuple. The subsequent processing element may include a tuple decryption operation (e.g., a decryption operation or decryption instructions), which instructs the subsequent processing element to decrypt the tuple that was encrypted by the initial processing element. For example, a first processing element may encrypt a tuple of a tuple stream after processing the tuple using the encryption instructions given to the first processing element. The tuple may then progress to the second processing element where the encrypted tuple is decrypted by the decryption instructions given to the second processing element. For example, a compute node may be offsite, which may result in tuples having to travel though a non-secure space where a non-authorized user may intercept the tuples. To prevent the tuples from being intercepted from non-authorized users encryption and decryption operations may be incorporated such that the data may be un-readable by the non-authorized user. For example, offsite compute nodes may be compute nodes that communicate through an unsecured computer-to-computer network.

In various embodiments, processing elements may include both encryption and decryption instructions. For example, a processing element may receive an encrypted tuple that the processing element may need to decrypt before processing. After decrypting the encrypted tuple, the processing element may then process the tuple. After processing the tuple, the processing element may then need to encrypt the tuple before sending the tuple to the subsequent processing element.

In various embodiments, a first encryption operation may not include the same encryption instructions as a second encryption operation. A transfer of a tuple between a first set of processing elements may include a first encryption operation using a first encryption key (first set of encryption instructions), and a transfer of the tuple between a second set of processing element may include a second encryption key (second set of encryption instructions). The different encryption processes may be used to protect the data between transfers of different security levels or a split operator may be configured to encrypt tuples depending on their destination. For example, a split processing element may include two encryption operations including a first encryption key, and a second encryption key.

The streaming environment may also include a fusion manager configured to alter the operator graph by decoupling and fusing selected processing elements of the operator graph. The altering of the operator graph may be used to increase the efficiency of the operator graph.

In various embodiments, programming instructions may be incorporated into the processing elements to include instructions on fusion. The fusion instructions may include a determination of whether a processing element is susceptible to fusion. Fusion susceptibility may include a determination of whether a first processing element may fuse with another processing element of a second compute node. Fusion susceptibility may also include a determination of whether a first processing element may not fuse with another processing element of a second compute node. Programming instructions of a first processing element and programming instructions of a second processing element may be compared for fusion compatibility. If the programming instructions of the first processing element and the programming instructions of the second processing element are compatible, then the first processing element and the second processing element may be fused together on a compute node. The instructions for fusion are further described herein.

The management system of the streaming environment may include an operator graph, a stream manager, a fusion manager, and an encryption manager. The fusion manager may fuse together two or more processing elements operating independently on a first and a second compute node within the streaming environment. The fusion manager may be a streams profiler that monitors the workload of the compute nodes within the streaming environment. The fusion manager may also be communicatively coupled with a streams manager that performs various functions on the streaming environment. The reduction of the two or more processing elements running on individual compute nodes may increase the performance of the streaming environment. Performance may include the processing load request of the one or more compute nodes within a cluster of compute nodes. For example, reducing the number of processing elements operating on individual compute nodes may reduce the number of compute nodes that are required to transfer the tuples in and out of the processing elements. The one or more processing elements may communicate over transmission control protocol/internet protocol (TCP/IP) by ordering attributes from one processing element to another.

Fusion information may be located within sections of the programming instructions or code. The programming instructions may be used by the fusion manager to determine fusion points. The fusion of the processing elements may be determined by the fusion manager and may be used to determine an increase or decrease in efficiency of the stream by fusing a plurality of processing elements. However, performing the determination during compile time may include limitations. An example of a limitation may include, without doing runtime analysis, the fusion manager having a decreased understanding of the location of the processing elements within the processing elements within the stream environment. Whereas performing the determination of the fusion points during run time, may allow the fusion manager to locate the processing elements, their locations within the compute nodes of the streaming environment, and monitor the current efficiency of the processing elements.

Although the combination of multiple processing elements within a single compute node may decrease the amount of compute nodes of the cluster needed to operate the streaming environment, loading all of the processing elements onto the single compute node may overload the single compute node. To prevent a workload of a compute node from becoming overloaded, the processing elements may be balanced between compute nodes. To determine if a compute node is overloaded, a threshold may be used to determine a total available processing load compared to a required processing load.

A total available processing load may be the amount of power available of a compute node to run the one or more processing elements operating on the compute node. The required processing load (processing load) may be the amount of power required to run each processing element. The processing load may be specific to each compute node of the streaming environment. The processing load may be a percentage of power (e.g., 15%) used of the total available processing load (e.g., 100%) of the compute node. For example, if five processing elements exist within the streaming environment, each of the five processing elements may contain one or more operators, which perform various operations on tuples passing through the processing element. The fusion of the processing elements may be determined based on the encryption between compute nodes within the streaming environment. If encryption is required when transferring tuples between a first compute node and a second compute node, but not required when transferring tuples between the second compute node and the third compute node, then the first compute node may be removed and the five processing elements may be distributed between the second and third compute nodes.

To prevent a compute node from being overloaded, thresholds may be incorporated. An upper threshold may be placed upon a workload of a compute node to prevent the compute node running a plurality of fused processing elements from being overloaded. For example, a plurality of processing elements may be operating on a first compute node. If the combined workload of the plurality of processing elements reaches the upper threshold, then the compute node may be overloaded. Thresholds relating to the workload of processing elements will be described further herein.

The workload may contain runtime statistics of the compute nodes. Runtime statistics may include the workloads of processing elements within the stream environment. Runtime statistics may be used to provide the workload to the compute nodes and processing elements, and may be stored as historical information. The historical information may include the previous operations the processing element performed. The historical information may include the previous fusion of the processing elements. For example, the runtime statistics may be stored on a first compute node. The first compute node may contain a first processing element and a second processing element that were fused. The first compute node may include the historical information of the first processing element and the second processing element. The workload of the first processing element and the workload of the second processing element may be combined and future workloads of the first processing element and the second processing element may be recorded.

A limitation of fusing a plurality of processing elements may include too many processing elements running on a single compute node. To prevent a compute node from being overloaded, a streams manager may monitor the stream environment in real time. The streams manager may communicate the workloads of the compute nodes with the fusion manager. The fusion manager may analyze the workloads of the compute nodes and processing elements as the operators perform operations upon the tuples. The fusion manager may also fuse processing elements from a first compute node to a second compute node to reduce the overall number of processes running on a given compute node without changing an end result of the stream. By reducing the amount of processing elements operating on independent compute nodes, more jobs may executed on a single compute node without overburdening the compute node thusly reducing the amount of compute nodes operating within the streaming environment.

The streams manager may perform a runtime analysis of the current operators running within the streaming environment. The runtime analysis may include monitoring the plurality of operators of a processing element. The operators may perform operations upon tuples within the streaming environment. The streams manager may use information gathered by monitoring the processing element to determine the workloads of the processing elements and/or whether a fusion of a plurality of processing elements may be performed.

In various embodiments, the fusion manager may monitor processing elements after fusion. The fusion manager may monitor the one or more processing elements that were involved in the fusion and determine if the fusion was successful or unsuccessful. A successful fusion could include completing the intended result based on the reason for originally fusing the plurality of processing element. For example, a first processing element of a first compute node may be fused to a second compute node because the workload of the first processing element originally contained by the first compute node was overloaded. If the fusion of the first processing element to the second compute node decreased the workload of the first compute node, then the fusion may be deemed successful. An unsuccessful fusion could include not completing the intended result based on the reason for originally fusing the plurality of processing element. For example, a first processing element may be fused to a second compute node because the workload of the first compute node originally containing the first processing element was overloaded. If the fusion of the first processing element to the second compute node increases the workload of the first compute node, then the fusion may be deemed unsuccessful.

In various embodiments, the fusion manager may store a history of previous runs on the application of the streaming environment. The history of previous runs may include the workloads of one or more processing elements within the streaming environment. The workloads of the plurality of processing elements may be gathered by a streams manager of the streaming environment and displayed upon a GUI. The history of the workloads of the plurality of processing elements may be used to determine fusion points of the plurality of processing elements within one or more compute nodes. The history of the workloads may be used by the fusion manager or an end user to determine fusion points of the processing elements.

In various embodiments, the fusion of one or more processing elements may be used to decrease the overall workload of the stream environment. The fusion of the one or more processing elements may free up some of the processing load of the compute node within the cluster of the streaming environment. If one or more processing elements are fused onto a single processing element, the amount of compute nodes being operated upon by the streaming environment may be decreased, reducing the required processing load of the stream. For example, a first processing element and a second processing element, each running on a separate compute node, may be fused. The first processing element may be decoupled from the first compute node, and fused with a second compute node. If the first processing element is removed from the first compute node, then the first compute node may have zero processing elements operating on the first compute node, and the first compute node may be removed from the operator graph.

In various embodiments, the fusion of one or more processing elements may be used to decrease the workload of a single compute node. The fusion of one or more processing elements located on two or more different compute nodes may decrease the workload of at least one of the compute nodes. Compute nodes requiring more processing load than others may be considered overloaded when compared to other processing elements. For example, a first compute node may require an increased processing load when compared to a processing load of a second compute node. The first compute node may contain one or more processing elements, which may be able to be migrated to the second compute node. The one or more processing elements may be migrated from the first compute node to the second compute node. After decreasing the amount of processing elements within the first compute node, the first compute node may require less processing load than previously.

In various embodiments, the fusion of one or more processing elements may be used to increase the workload of a single compute node. The fusion of processing elements of two compute nodes may increase the workload of one of the compute nodes. Compute nodes requiring less processing load than others may be considered underutilized when compared to other compute node. For example, a first compute node may require a decreased processing load compared to a second compute node. If the first compute node contains one or more processing elements that contain the programming instructions to be migrated to the second compute node, then the one or more processing elements may be migrated from the first compute node to the second compute node. After increasing the amount of processing elements within the second compute node, the second compute node may require more processing load than originally.

FIG. 1 illustrates an example of a computing infrastructure 100 that may be configured to execute a stream computing application, according to some embodiments. The computing infrastructure 100 includes a management system 105 and two or more compute nodes 110A-110D—e.g., hosts—which are communicatively coupled to each other using one or more communications networks 120. The one or more communications networks 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120. The development system may include a compiler 136, a processing element (PE) manager 140, and an encryption manager 142.

The management system 105 may include an operator graph 132, a stream manager 134, a fusion manager 141, and an encryption manager 143. The operator graph 132 may include the instructions of the ordering of a plurality of processing elements of the streaming environment. The operator graph 132 may order the plurality of processing elements based on the function of the streaming environment. The stream manager 134 may include instructions to monitor functions of the streaming environment. The stream manager 134 may collect information of tuples, operators, and processing elements of the streaming environment. The stream manager 134 may determine operations to be performed on the operator graph depending on the collected information. The fusion manager 141 may collect information of tuples, operators, and processing elements of the streaming environment. The fusion manager 141 may fuse operators within the streaming environment. The encryption manager 143 may be the same or different that the encryption manager 142 of development system 102. The encryption manager 143 may determine encryption operations and decryption operations to be performed on tuples as the tuples enter and exit the compute nodes of the operator graph 132. The fusion of operators may include removing operators from processing elements, and fusing the operators to other processing elements based on the collected information.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media, and whether particular network hardware or software is functioning correctly, or at full capacity. In addition, the bandwidth that a particular link provides to a stream computing application may vary if the link is shared with other applications and/or users. The available bandwidth may vary depending on the load placed on the link by the other applications and users. The bandwidth that a particular link provides may also vary depending on a temporal factor, such as time of day, day of week, day of month, or season.

Figure 2:
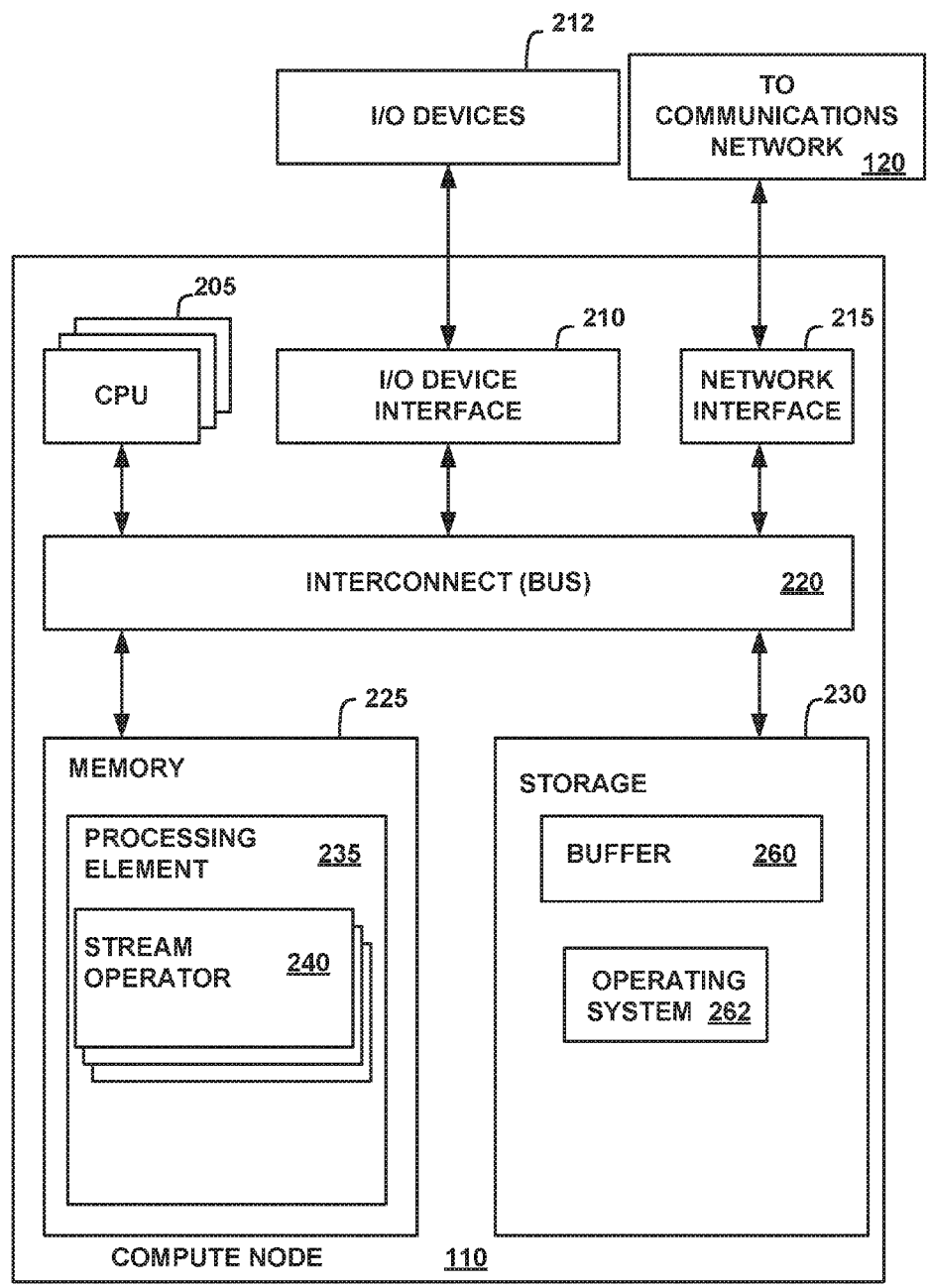
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an Input/Output I/O device interface 210 used to connect I/O devices 212, e.g., keyboard, display, stylus, touchscreen, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may include one or more busses. The CPUs 205 may be a single CPU, multiple CPUs, or a single CPU having multiple processing cores, in various embodiments. In one embodiment, a processor 205 may be a digital signal processor (DSP). One or more processing elements 235 (described herein) may be stored in the memory 225. A processing element 235 may include one or more stream operators 240 (described herein). In one embodiment, a processing element 235 is assigned to be executed by one CPU 205, although in other embodiments the stream operators 240 of a processing element 235 may include one or more threads that are executed on two or more CPUs 205. The memory 225 is generally included to be representative of a random access memory (RAM), e.g., Static Random Access Memory (SRAM), Dynamic Random Access Memory (DRAM), or Flash. The storage 230 is generally included to be representative of a non-volatile memory, such as a hard disk drive (HDD), solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120, according to various embodiments.

A stream computing application may include one or more stream operators 240 that may be compiled into a "processing element" container 235. The memory 225 may include two or more processing elements 235, with each processing element having one or more stream operators 240. Each stream operator 240 may include a portion of code that processes tuples flowing into a processing element. The stream operators may then output the tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both. Moreover, storage 230 may include storage space that is external to the compute node 110, such as in a cloud.

The compute node 110 may include one or more operating systems 262. An operating system (OS) 262 may be stored partially in memory 225 and partially in storage 230. Alternatively, an OS may be stored entirely in memory 225 or entirely in storage 230. The OS provides an interface between various hardware resources, including the CPU 205, and processing elements and other components of the stream computing application. In addition, an OS provides common services for application programs, such as providing a time function.

Figure 3:
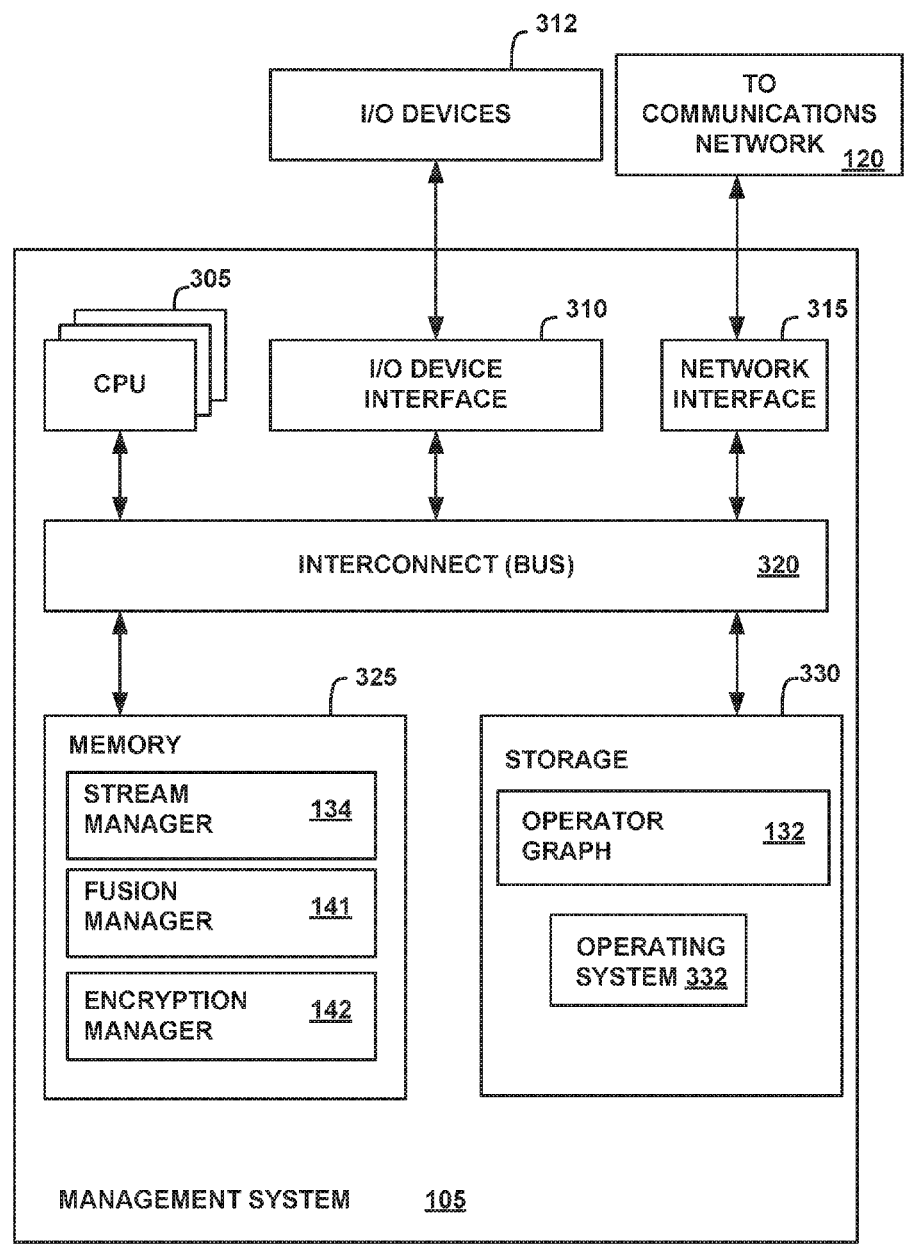
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, stylus, touchscreen, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a RAM, e.g., SRAM, DRAM, or Flash. The storage 330 is generally included to be representative of a non-volatile memory, such as a HDD, SSD, removable memory cards, optical storage, Flash memory devices, NAS, connections to storage area-network (SAN) devices, or the cloud. The network interface 315 is configured to transmit data via the communications network 120.

The memory 325 may store a stream manager 134, a fusion manager 141, and an encryption manager 143. The stream manager 134 may monitor one or more operators operating within the streaming environment. The memory 325 may store a fusion manager 141. The fusion manager 141 may monitor the workloads of the operators within the streaming environment. The operators may be combined into processing elements, which may accept tuples, and allow the operators to perform operations on the tuples. The fusion manager 141 may determine if operators can be fused to combine one or more operators into a processing element. Additionally, the storage 330 may store an operator graph 132. The operator graph 132 may define how tuples are routed to processing elements 235 (FIG. 2) for processing. The encryption manger 142 may determine if a transfer of tuples requires an encryption or decryption operation, encryption and decryption operations are described further herein.

The management system 105 may include one or more operating systems 332. An OS 332 may be stored partially in memory 325 and partially in storage 330. Alternatively, an OS may be stored entirely in memory 325 or entirely in storage 330. The OS provides an interface between various hardware resources, including the CPU 305, and processing elements and other components of the stream computing application. In addition, an OS provides common services for application programs, such as providing a time function.

Figure 4:
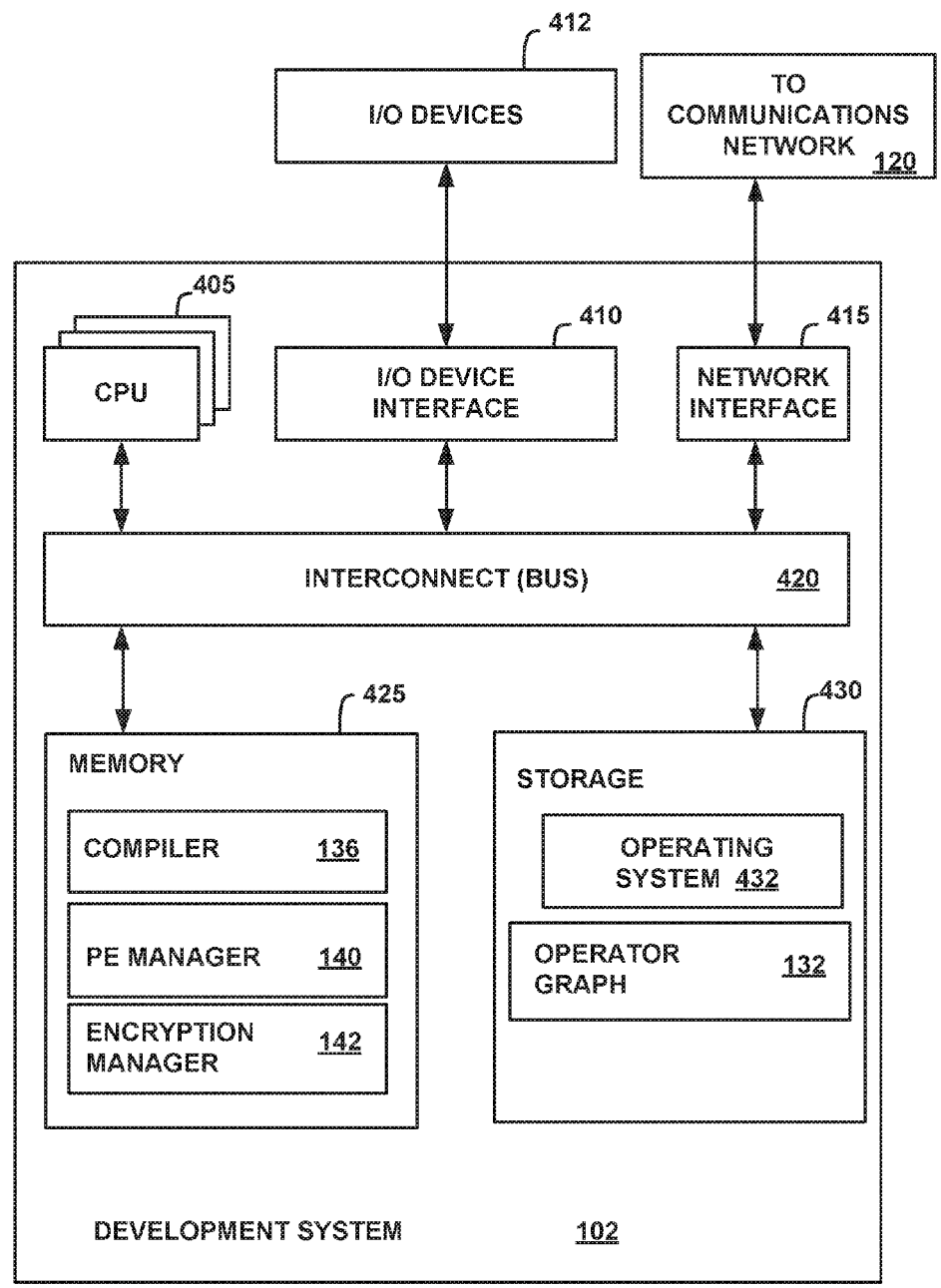
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, stylus, touchscreen, and mouse devices, to the development system 102.

The development system 102 may be an integrated development environment (IDE). The IDE may include tools for determining theoretical processing loads of compute nodes and processing elements before the streaming environment is operational. By determining theoretical processing loads of the compute nodes, the processing elements may be placed and ordered based on processing loads as well as other factors. For example, five processing elements may be needed for the stream environment and three compute nodes may be available. Based on a theoretical processing load of each of the five processing elements, a theoretical encryption/decryption workload, and the available compute nodes, the IDE may place the processing elements as efficiently as possible. Based on the theoretical workloads the IDE may determine that the first compute node may receive two processing elements, the second compute node may receive one processing element, and the third compute node may receive two compute nodes.

The IDE may also be used to reorganize or modify a streaming environment during runtime, as the streams manager 134 of the development system 102. The streams manager 134 may determine that the streaming environment may be optimized based on data received by the encryption manager 142. The encryption manager may be used in conjunction with the streams manager 134 to optimize an operator graph 132. The IDE may include a graphical user interface (GUI) where a user may modify or optimize the operator graph 132.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a RAM, e.g., SRAM, DRAM, or Flash. The storage 430 is generally included to be representative of a non-volatile memory, such as a HDD, SSD, removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An OS 432 may be stored partially in memory 425 and partially in storage 430. Alternatively, an OS may be stored entirely in memory 425 or entirely in storage 430. The OS provides an interface between various hardware resources, including the CPU 405, and processing elements and other components of the stream computing application. In addition, an OS provides common services for application programs, such as providing a time function.

The memory 425 may store a compiler 136, a processing element (PE) manager 140, and an encryption manger 142. The compiler 136 compiles modules, which include source code or statements, into the object code, which includes machine instructions that execute on a CPU 405. In one embodiment, the compiler 136 may translate the modules into an intermediate form before translating the intermediate form into object code. The compiler 136 may output a set of deployable artifacts that may include a set of processing elements and an application description language (ADL) file, which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132. The PE manager 140 may determine the workloads of the processing elements within the stream environment, and determine fusion of one or more processing elements onto one or more compute nodes. The encryption manger 142 may determine if a transfer of tuples requires an encryption or decryption operation.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators may balance the benefits of distributing processing across multiple compute nodes with the benefit of faster inter-operator communications. The compiler 136 may automate the fusion process to determine how to fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
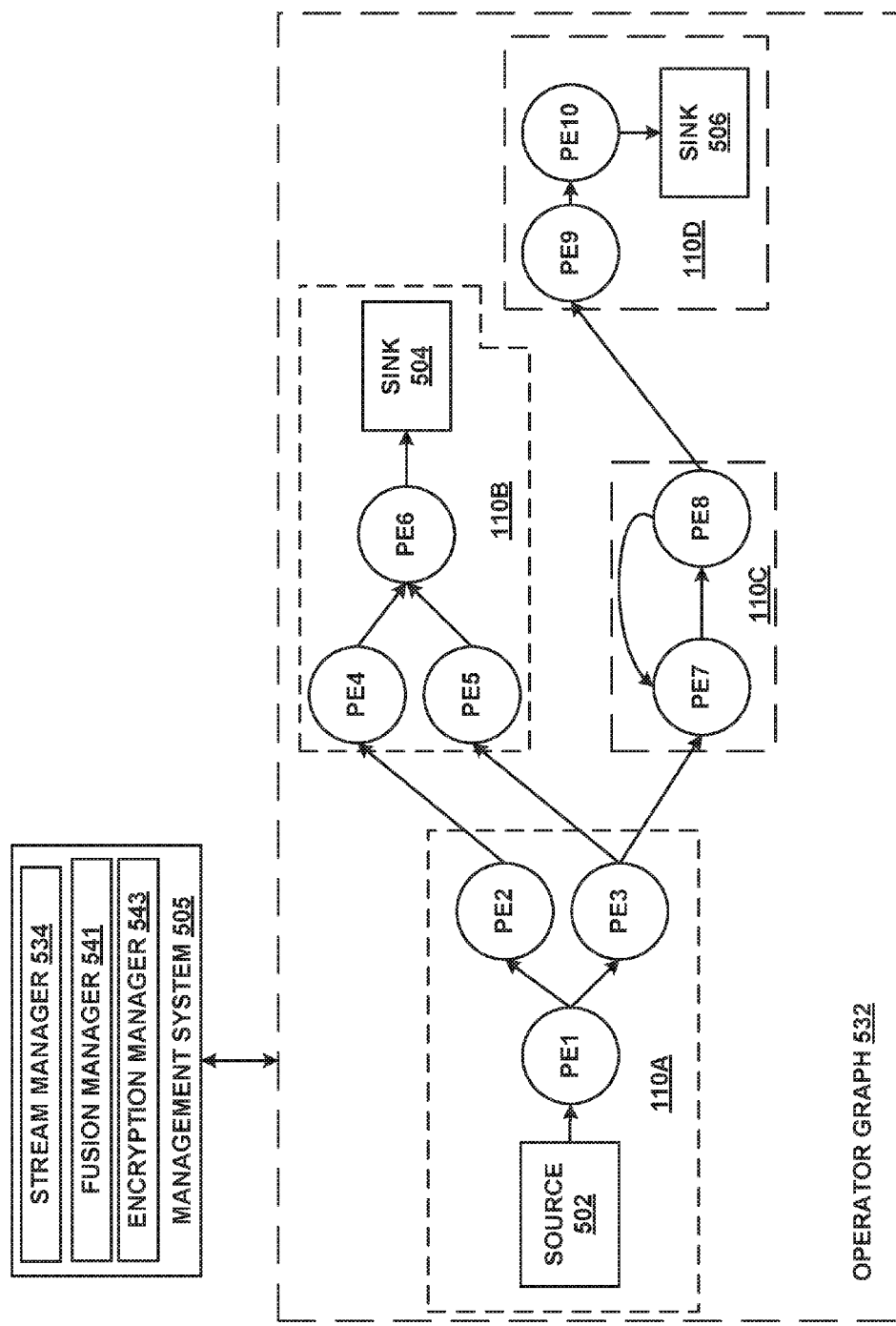
FIG. 5 illustrates an operator graph for a stream computing application, according to various embodiments.

FIG. 5 illustrates an operator graph 532 for a stream computing application beginning from a source 502 through to one or more sinks 504, 506, according to some embodiments. This flow from source 502 to the one or more sinks may also be generally referred to herein as an execution path. In addition, a flow from one processing element to another may be referred to as an execution path in various contexts. Although FIG. 5 is abstracted to show connected processing elements PE1-PE10, the operator graph 532 may include data flows between stream operators 240 (FIG. 2) within the same or different processing elements. Typically, processing elements, such as processing element 235 (FIG. 2), receive tuples from the stream as well as output tuples into the stream. In some embodiments, however, the processing element may be a sink 504 or 506, where the stream terminates, or a source 502, where the stream begins. While the operator graph 532 includes a relatively small number of components, an operator graph 532 may be much more complex and may include many individual operator graphs that may be linked together, either statically or dynamically.

The example operator graph 532 may be managed by a management system 505. The management system 505 may include a stream manager 534, a fusion manager 541, and an encryption manager 543. The stream manager 534 may perform functions on the stream environment. Functions that the stream manager 534 performs may include monitoring, recording, altering, and other various functions on the streaming environment and the tuples. The stream manager 534 may function along with or be commutatively coupled to the fusion manager 541. The fusion manager 541 may perform functions on the processing elements (PE1-10) and the compute nodes (110A-D) within the operator graph 532. The fusion manager 541 may monitor the streaming environment, measure a workload of the compute nodes and the processing elements, measure workloads of the encryption operations within the operator graph, determine thresholds of the workloads, and fuse processing elements together on a compute node.

The example operator graph 532 shown in FIG. 5 includes ten processing elements (PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications may be a resource in a stream computing application. However, when stream operators are fused together, the fused stream operators may use more rapid communication techniques for passing tuples among stream operators in each processing element.

The operator graph 532 begins at a source 502 and ends at one or more sinks 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink 504. Thus, in addition to being a sink 504 for this example operator graph 532, PE6 could be configured to perform a join operation, combining tuples received from PE4 and PE5. This example operator graph 532 also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements as shown in (FIG. 2 at 235), may be configured to receive or output tuples in various formats, e.g., the processing elements or stream operators could exchange data marked up as extensible mark-up language (XML) documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 534 of FIG. 1 may be configured to monitor a stream computing application running on compute nodes, e.g., compute nodes 110A-110D, as well as to change the deployment of an operator graph 532. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators. The processing elements may include one or more stream operators operating within the processing element. The processing elements may include execution paths to different stream operators within the same processing element. According to FIG. 5, an embodiment illustrates execution paths between processing elements for clarity.

Figure 6A:
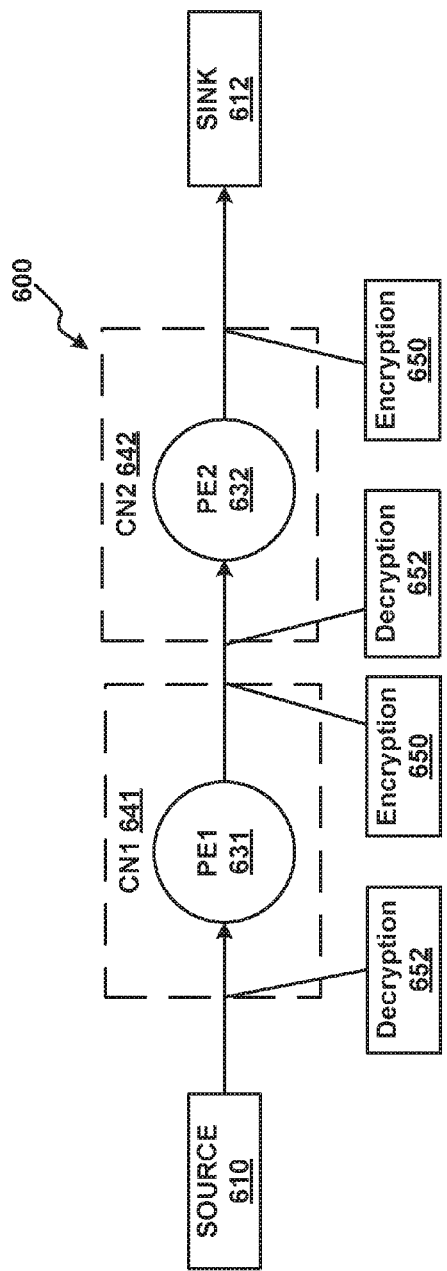
FIG. 6A illustrates two compute nodes with an assigned processing element requiring an encryption operation upon the transfer or tuples between the first compute node and the second compute node, according to various embodiments.

FIG. 6A illustrates two compute nodes of an operator graph with an assigned processing element requiring an encryption operation upon a transfer of tuples between a first compute node and a second compute node, according to embodiments. The transfer of tuples between a first compute node (CN1) 641 and a second compute node (CN2) 642 may utilize an encryption operation. The transfer of tuples may also include a source 610, which sends tuples into the stream environment, and a sink 612, which receives tuples after being operated upon by a final processing element of the first operator graph 600. The first operator graph 600 may include one or more processing elements, each of which may include one or more operators, which preform operations on a stream of tuples. The first compute node 641 includes a first processing element (PE1) 631 and the second compute node 642 includes a second processing element (PE2) 632.

The source 610 may send a stream of encrypted tuples to the first compute node 641, which may decrypt 652 the tuples upon entering the first compute node. The stream of tuples after decryption 652 may be operated upon by the first processing element 631 of the first compute node 641. The operators of the first processing element 631 may perform one or more operations upon the stream of tuples and after being operated upon may leave the first processing element therefore leaving the first compute node 641. Upon leaving the first compute node 641 the stream of tuples may be encrypted 650 before being sent to the second compute node 642. An operator within the first processing element 631 or an operator tied to the first compute node 641 may encrypt the stream of tuples as they leave the first processing element. The operator that encrypts 650 the stream of tuples may be the last operator within the first processing element 631. The stream of tuples may then enter the second compute node 641 to be operated upon by the operators of the second processing element 631. The stream of tuples may be decrypted 652 before being operated upon by the operators of the second processing element 632. After completion of operation of the operators of the second processing element 632, the stream of tuples may be encrypted 650 again before being sent to the sink 612 of the first operator graph 600. The tuples may then enter the sink 610 and be decrypted before being written to a storage.

The encryption operation may include an encryption operation 650 and a decryption operation 652. The encryption operation 650 may be performed as a tuple leaves a compute node encrypting the tuples that are transferred after being processed by one or more processing elements within the compute node. For example, the first processing element 631 may finish processing a first tuple. The first tuple may leave the first processing element and be encrypted at the encryption operation 650. The decryption operation 652 may be performed as a tuple enters a compute node decrypting the tuples that are transferred before being processed by one or more processing elements within the compute node.

The first operator graph 600 may include thresholds of a workload of the first compute node 641 and the second compute node 642. The thresholds of the workloads may be used to determine if the processing load of the first compute node 641 or the second compute node 642 are overloaded or under-loaded. Additionally, encryption 650 and decryption 652 workload thresholds may be set on the encryption operations 650 and decryption operations 652 of the first compute node. The encryption operations 650 may include an encryption workload, and the decryption operations 652 may include a decryption workload. The encryption workload may be used to determine a processing load consumed by the encryption operations 650. The encryption workload may be measured as a percentage of a total available processing power of the compute node hosting the encryption operation. For example, a first encryption operation 650 may have an encryption workload requiring 15% of the total available processing power (100%). The decryption workload may be used to determine a processing load consumed by the decryption operations 652. The decryption workload may be measured as a percentage of a total available processing power of the compute node hosting the decryption operation. For example, a first decryption operation 652 may have an encryption workload requiring 10% of the total available processing power (100%).

In an example, the first operator graph 600 may be monitored for the total processing load for each compute node processing of a plurality of tuples. The percentages may be measured out of a total available workload wherein a 100% processing load may be the maximum processing workload of a compute node. A total processing load threshold of the processing workload may be incorporated to determine if a compute node is overloaded. An encryption workload and a decryption workload (encryption/decryption workload) threshold may be incorporated to determine if the operator graph may be determined for optimization. In the example, the first processing element 631 of the first compute node 641 may be operating at a workload of 30% of the total processing load of the first compute node, and the encryption/decryption workload may be 25% broken into 15% for encryption 650 and 10% for decryption 652. The total processing load used by the first compute node 641 may result in a 55% usage of the first compute node. The second processing element 632 of the second compute node 642 may be operating at a workload of 35% of the total processing load of the second compute node, and the encryption/decryption workload may be 30% broken into 15% for encryption 650 and 15% for decryption 652. The total processing load used by the second compute node 642 may result in a 65% usage of the second compute node.

In the example, a threshold may be set for the total processing load of the first compute node 641 and the second compute node 642. The threshold of the total processing load may be set at 95%. Since the total processing load of the first compute node 641 is 55% and the total processing load of the second compute node 642 is 65%. Both the first compute node and second compute node have not reached the threshold of 95% of the total processing load. Therefore, the first processing element 631 and the second processing element 632 may not be fused due to the threshold being set for the total processing load.

In the example, a threshold may be set for the encryption/decryption workload of the first operator graph 600 of the first compute node 641 and the second compute node 642. The encryption/decryption workload may be set at 30%. Since the encryption/decryption workload of the second compute node 642 totals to 30% (encryption 15% and decryption 15%), the encryption/decryption workload of the second compute node has reached the threshold. The first processing element 631 and the second processing element 632 may then be fused onto a single compute node. The single compute node may include the first compute node 641, the second compute node 642, or a possible third compute node (CN3) (e.g. CN3 of FIG. 6B). For example, the fusion may include decoupling the first processing element 631 from the first compute node 642 and fusing the first processing element to the second compute node. In an additional example, the fusion may include decoupling the first processing element 631 from the first compute node 641, decoupling the second processing element 632 from the second compute node 642, and fusing the first processing element and the second processing element to a third compute node (the second operator graph 601 in FIG. 6B).

In various embodiments, the encryption operations 650 and decryption operations 652 between the source 610 and the first compute node 641, between the first compute node 641 and second compute node 642, and between the second compute node 642 and the sink 612 may all include the same encryption key or different encryption key, depending on the streaming environment. For example, the encryption operation 650 may include the same encryption key for each encryption operation of the first operator graph 600. In an additional example, a first encryption key of the encryption operation 650 used in the tuple transfer between the source 610 to the first compute node 641 may be different than a second encryption key of the encryption operation 650 used in the tuple transfer between the first compute node 641 to the second compute node 642.

Figure 6B:
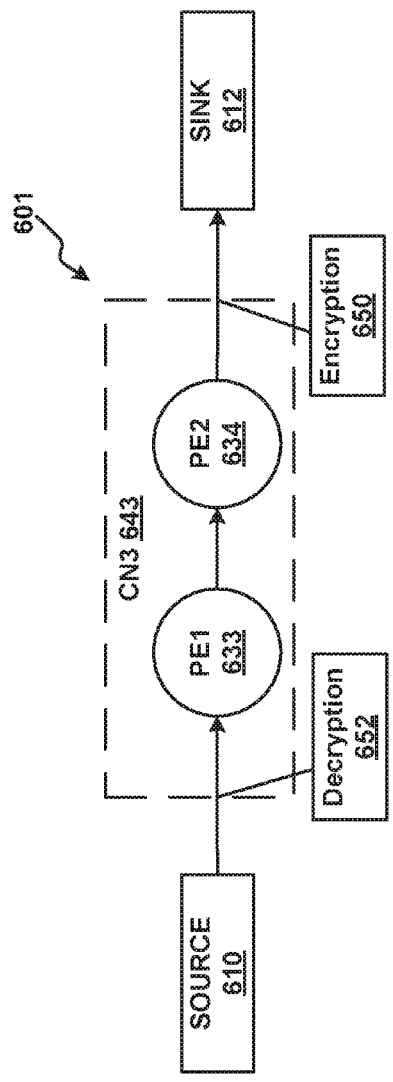
FIG. 6B illustrates a fusion of two processing elements onto a single compute node reducing the encryption workload of the tuple encryption operation, according to various embodiments.

In FIG. 6B, a migration and fusion of two processing elements onto a single compute node is illustrated, according to embodiments. The fusion may reduce the encryption workload of an encryption operation. A second operator graph 601 may include the migration and fusion of the first processing element 633 and the second processing element 632, which have been fused on to a third compute node (CN3) 643. The first processing element 633 may not require an encryption operation when sending tuples to the second processing element 634 because they are both within the same third compute node 643.

The fusion of the first processing element 633 and the second processing element 634 onto the third compute node 643 may be a result of a threshold being reached of the encryption/decryption workload. The second operator graph 601 may be obtained by decoupling the first processing element 633 from the first compute node, and the second processing element from the second compute node 634 and removing first compute node 643 and the second compute node 642 from the first operator graph 600. The first processing element (PE1) 633 and the second processing element (PE2) 634 may be migrated to the third compute node (CN3) 643 and then fused to the third compute node. For example, the first processing element 631 of the first compute node 641 and the second processing element 632 of the second compute node 642 of the first operator graph 600 (FIG. 6A) may be fused to create the third compute node 643 as the first processing element 633 and second processing element 634. The fusion of the first processing element 633 and the second processing element 634 includes removing at least one encryption operation 650 and at least one tuple decryption operation 652.

In the example, the fusion of the first processing element 633 and the second processing element 634 onto the third compute node 643 illustrated in the second operator graph 601 may result in a total processing load of 90%. The total processing load includes the processing load of the first processing element 633 at 30%, the processing load of the second processing element 634 of 35%, and the encryption/decryption workload of 25% including a 10% decryption workload and a 15% encryption workload. The 10% decryption operation 652 workload results from tuples needing to be decrypted from being received from the source 610 by the first processing element 633, and the 15% encryption operation 650 workload results from tuples being encrypted before being sent from the second processing element to the sink 612.

The second operator graph 601 includes a removal of the encryption operation 650 and decryption operation 652 when sending the tuples from the first processing element 633 to the second processing element 634. Removing the encryption operation 650 and tuple decryption operation from the transfer of tuples from the first processing element 633 to the second processing element 634 includes a reduction in a total processing power of 30%, 15% from the encryption operation 650 and 15% from the decryption operation 652.

Since the total processing load by the third compute node is 90% and below the total processing load threshold of 95% then the fusion may be retained. In various embodiments, if the total processing load threshold is 85% and the total processing load of the third compute node is 90% then the fusion may be reverted.

In various embodiments, if the encryption/decryption workload is greater than a percentage of the workload of a processing element of a neighboring processor. The processor may be fused to remove the encryption workload. The neighboring processor fusion may be a result of the encryption/decryption workload being a percentage of an operating workload of a neighboring processing element of a neighboring compute node. In the example, if the decryption operation 652 workload of the second compute node is 15% and the workload of the first processing element 633 is 20%. If a threshold is set for a fusion to occur if the decryption operation workload takes 75% of a workload of a processing element, then the first processing element 633 may be decoupled from the first compute node 641 and fused to the second processing element 642. In various embodiments, the source 610 operator of the operator graph 601 may not be issuing the tuples into the stream environment. The source 610 may be a prior compute node or a separate stream environment, which sends the stream of tuples to the initial compute node of the operator graph (i.e. the first compute node 631).

In various embodiments, the sink 612 operator of the operator graph 601 may not be writing the tuples to memory or distributing the data to a system. The sink 612 may be for example a TCP/IP Sink where, the stream of tuples may be sent from the final compute node of the operator graph (i.e. the second compute node 634) to a secondary application.

Figure 7:
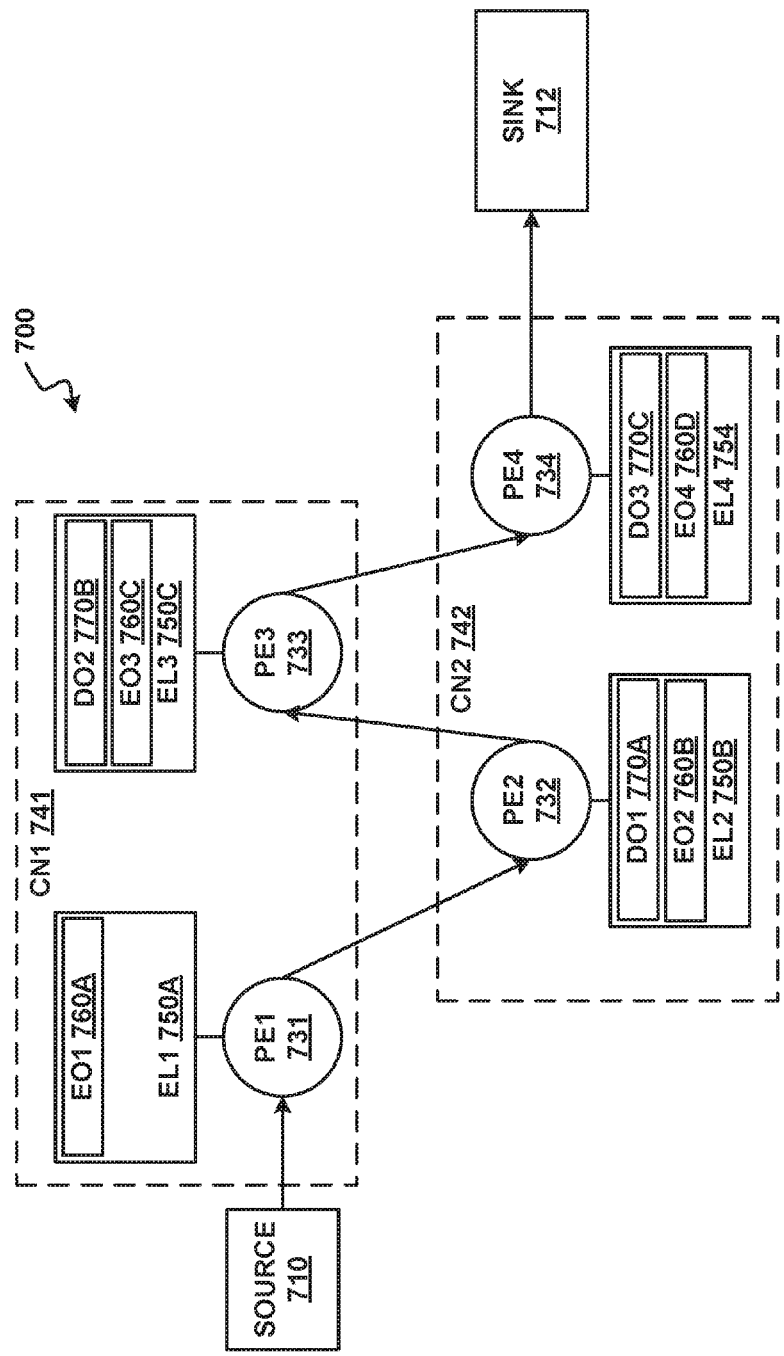
FIG. 7 illustrates an operator graph including encryption operations as tuples are transferred between a first compute node and a second compute node, according to various embodiments.

FIG. 7 illustrates an operator graph including encryption operations as tuples are transferred between a first compute node 741 and a second compute node 742, according to various embodiments. The operator graph of the stream environment may include a first compute node 741 and a second compute node 742. The first compute node 741 includes a first processing element 731, and a third processing element 733. The second compute node 742 includes a second processing element 732 and a fourth processing element 734. The compute nodes may distribute a stream of tuples between the processing elements, wherein the stream of tuples may start at a source 710 and end at a sink 712. When a tuple is sent from an initial processing element of an initial compute node to a subsequent processing element of a subsequent compute node the tuple may be encrypted before leaving the initial processing element and decrypted when entering the subsequent processing element. The encryption and decryption of the tuples may be performed by an encryption and a decryption operation. For example, a first tuple may be processed by the first processing element 731 of the first compute node 741. Upon completion of processing by the first compute node 741, the first tuple may be sent to the second compute node 732 of the second compute node 742. When the tuple is sent to the second compute node, the tuple may be encrypted by the first encrypt operation (EO1) 760A. The encrypted tuple encrypted by encryption operation 760A may be sent to the second compute node 742 and decrypted by the first decrypt operation (DO1) 770A.

The encryption operations and the decryption operations may be stored within an encryption layer (EL1) 750A. An encryption layer may be an operator, which performs encryption operations or decryption operations on tuples exiting or entering the processing element. For example, the first encryption layer 750A may store the first encryption operation 760A of the first processing element 731. In an additional example, a second encryption (EL2) 750B layer may store a first decrypt operation 770A, and a second encryption operation 760B. The encryption layers may organize the encryption operations of the compute nodes. In embodiments, the encryption layer may be an operator stored within the processing element that determines encrypts and/or decrypts the tuples based on the needs of the operator graph.

The layout of the operator graph 700 of the streaming environment may be one of various example layouts that when operating on a tuple of a stream of tuples may proceed as follows. A first tuple may be sent from the source 710 to the first processing element (PE1) 731 of the first compute node (CN1) 741. The tuple may be processed by the first processing element 731 and, before being sent to the second processing element (PE2) 732 of the second compute node (CN2) 742 the tuple, may be encrypted by a first encryption layer 750A with a first encryption operation 760A. After the first encryption operation 760A, the tuple is sent to the second processing element 732 and the tuple is decrypted by the second encryption layer 750B with a first decryption operation 770A. The tuple may be processed by the second processing element 732, and before being sent to the third processing element (PE3) 733 of the first compute node 741 the tuple may be encrypted by the second encryption layer 750B with a second encryption operation (EO2) 760B. After the second encryption operation 760B, the tuple is sent to the third processing element 733 and the tuple is decrypted by the third encryption layer (EL3) 750C with a second decryption operation (DO2) 770B. The tuple may be processed by the third processing element 733, and before being sent to the fourth processing element (PE4) 734 of the second compute node 742 the tuple may be encrypted by the third encryption layer 750C with a third encryption operation (EO3) 760C. After the third encryption operation 760C, the tuple is sent to the fourth processing element 734 and the tuple is decrypted by the fourth encryption layer (EL4) 750D with a third decryption operation (DO3) 770C. The tuple may be processed by the fourth processing element 734, and before being sent to the sink 712 the tuple may be encrypted by the fourth encryption layer 750D with a fourth encryption operation (EO4) 760D. The tuple may then be sent to the sink 712.

By transferring the tuple back and forth between compute nodes, the amount of encryption and decryption operations may increase the workload of the operator graph increasing the total processing load of the first compute node 741 and the second compute node 742. To decrease the amount of encryption operations and decryption operations, the operator graph may be optimized by a PE optimizer. The optimization of the operator graph may decrease an overall processing load of the first compute node and the second compute by removing encrypt operations and decrypt operations, but may alter the total processing load depending on the exchange and fusion of the one or more processing elements being exchanged.

Figure 8:
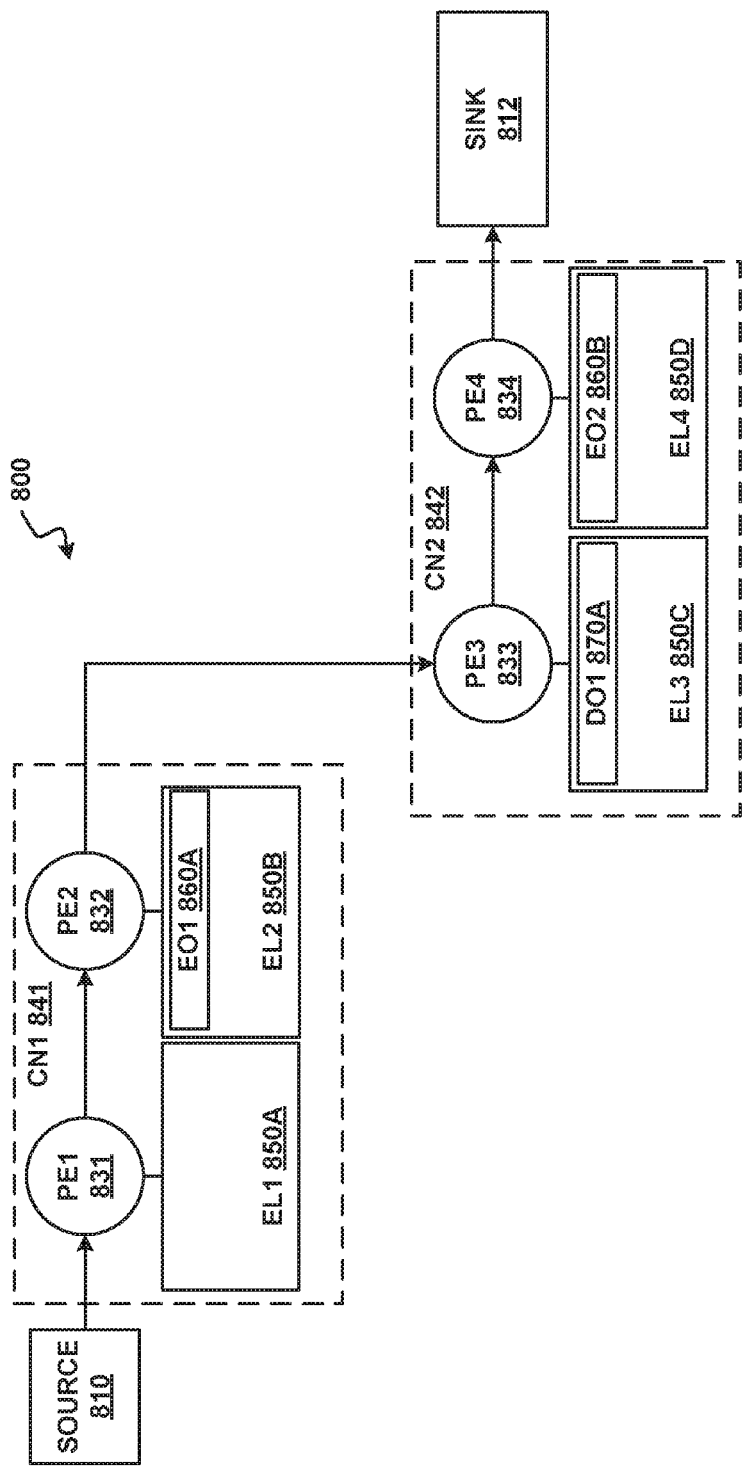
FIG. 8 illustrates an operator graph after an optimization operation, according to various embodiments.

FIG. 8 illustrates an operator graph after an optimization operation, according to various embodiments. An operator graph (e.g., 700, FIG. 7) may be optimized to reduce the encryption/decryption workload of the operator graph. The operator graph may be optimized by migrating one or more of the processing elements between compute nodes creating an optimized operator graph 800. The optimized operator graph 800 may reduce the amount of encryption operations by two and decryption operations by two by migrating the second processing element 832 to the first compute node 841 and the third processing element 833 to the second compute node 842. The migration of the processing elements may include decoupling the processing elements to be migrated, migrating the processing elements, and fusing the processing elements to a compute node. The reduction of encryption operations and decryption operations may reduce the total processing load by the optimized operator graph 800. The progression of the optimized operator graph 800 may be the same as the original operator graph 700, which may not change the operations upon the tuples but which compute node hosts the processing elements.

The layout of the optimized operator graph 800 of the streaming environment may be an example layout that when operating on a tuple of a stream of tuples may proceed as follows. A first tuple may be sent from the source 810 to the first processing element 831 of the first compute node 841. The first processing element 831 may operate upon the first tuple and because the second processing element 832 is within the first compute node 841 the tuple may not need to be encrypted before being sent to the second processing element and the first encryption layer 850A may not perform an encryption operation or a decryption operation. The tuple may be operated upon by the second processing element 832 and after processing, the tuple may be sent to the third processing element 833. Since the third processing element 833 is within the second compute node 842, the tuple may need to be encrypted before being sent. The second encryption layer 850B may encrypt the tuple with the first encryption operation 860A before sending the tuple to the third processing element 833. The third processing element may receive the encrypted tuple from the second processing element 832 and decrypt the tuple using the first decrypt operation 870A within the third encryption layer 850C. The third processing element 833 may process the tuple and upon completion of the processing send the tuple to the fourth processing element. Because the fourth processing element 834 is within the second compute node 842 the tuple may not need to be encrypted before being sent to the fourth processing element and the third encryption layer may not perform an encryption operation. The tuple may be sent to the fourth processing element 834 and processed. Upon completion of the processing, the fourth encryption layer 850D may encrypt the tuple using encryption operation 860B before sending the tuple to the sink 812.

In various embodiments, the optimization of the encryption/decryption operation of the streaming environment may not require the tuples to be encrypted before being sent to the sink of the operator graph. If the source or the sink is stored within a compute node, or in a secure location relative to the compute node, the encryption/decryption operations may not be required to process or send the tuples.

Figure 9:
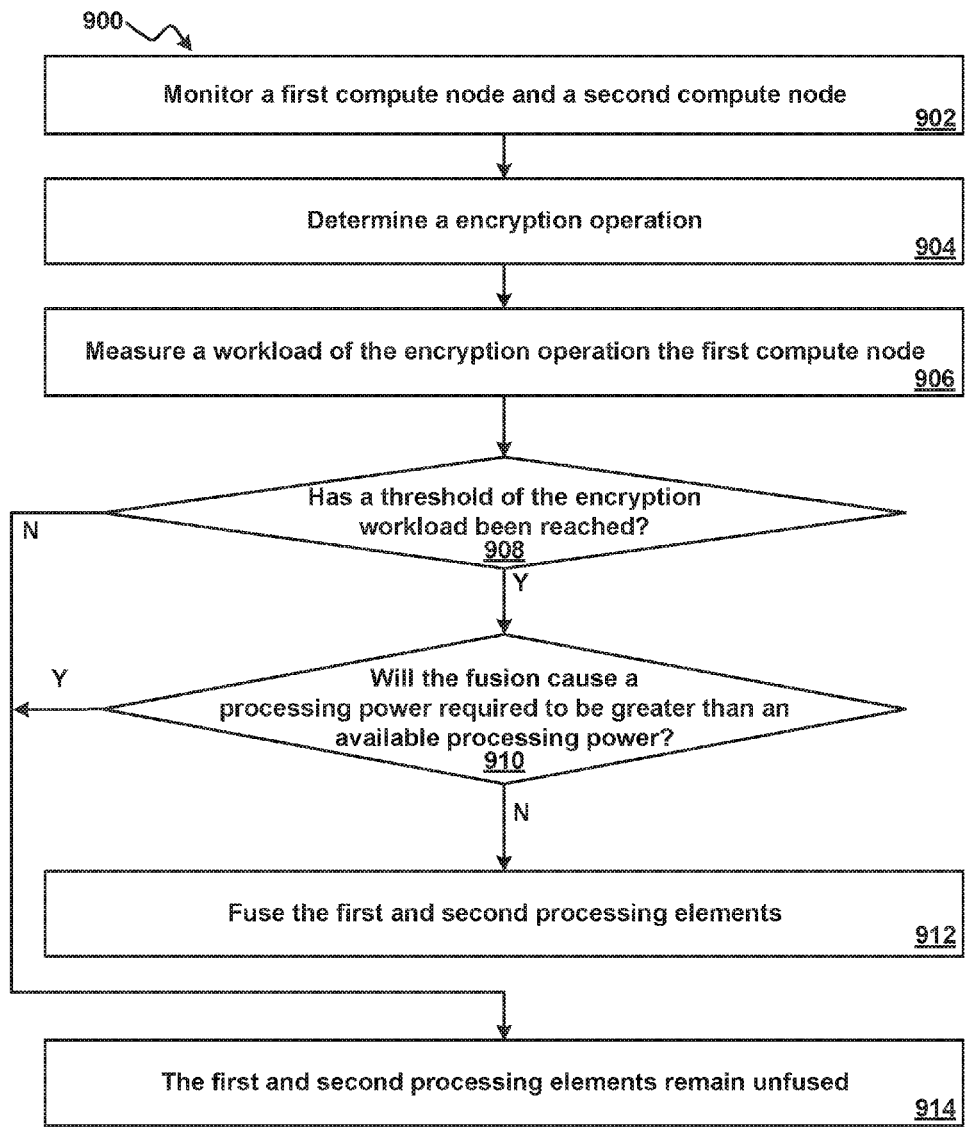
FIG. 9 illustrates a flowchart of a method of an encryption operation after a fusion of processing elements to the two compute nodes, according to various embodiments.

FIG. 9 illustrates a flowchart of a process 900 for determining a threshold being reached of a workload of an encryption operation, according to embodiments. The threshold of the workload of the encryption operation may be used to determine if a first processing element of a first compute node and a second processing element of a second compute node may be fused onto either the first compute node, the second compute node, or a new third compute node.

The process 900 may begin at operation 902, where a first compute node and a second compute node may be monitored within an operator graph of a streaming environment. The first compute node and the second compute node may have one or more processing elements operating on tuples as they pass through the compute nodes. For example, the first compute node may have a first processing element, and the second compute node may have a second processing element (e.g. FIG. 6A).

In operation 904, an encryption operation is determined. The encryption operation may include an encryption operation or a decryption operation, which, respectively, encrypts or decrypts tuples as they enter or exit a processing element. For example, an encryption operation of a first compute node maybe used to encrypt tuples as they leave the first compute node before the tuples enter the second compute node. The first compute node may contain a first processing element, which after the completion of processing sends the tuples to a second processing element within the second compute node. The tuples may be encrypted before leaving the first processing element, the encrypted tuples may be sent to the second processing element, and then decrypted and processed by the second processing element.

In operation 906, an encryption operation workload of the first compute node is measured. The encryption operation workload may include measuring the amount of processing load by the first compute node to encrypt the tuples before sending the tuples to the second compute node. For example, the encryption operation workload of the first compute node may be 10% of the total processing load of the compute node.

In operation 908, a threshold of the encryption workload of the first compute node is determined. The threshold of the encryption workload of the first compute node may include an amount of the total processing load of the compute node. If the encryption workload of the first compute node is below the threshold, then the process 900 may progress to operation 914. For example, if the threshold of the encryption workload is set at 15% of the total processing load and the encryption workload of the first compute node is 10%, then the threshold has not been reached. If the encryption workload of the first compute node has reached (or is above) the threshold, then the process 900 may progress to operation 910. For example, if the threshold of the encryption workload is set at 5% of the total processing load and the encryption workload of the first compute node is 10%, then the threshold has been reached. In various embodiments, the decryption operation workload may be measured and determined if a threshold of decryption workload has been reached.

In operation 910, since the threshold of the encryption workload has been reached at operation 908, a workload is determined if fusion will cause the total processing load after fusion to be greater than the available processing load or a total workload threshold. If a first processing element and a second processing element are to be fused onto a second compute node, then a theoretical total processing load workload may be determined. The theoretical processing load workload may be determined by adding the processing load of the first processing element and the second processing element together, as well as any encryption/decryption workloads that may be present. If the fusion causes the required total processing load to be lower than the available total processing load then the process 900 may progress to operation 912. For example, the determined theoretical processing load workload is below a total workload threshold set at 95% then the fusion may occur. If the fusion will cause the required total processing load to be greater than the available total processing load then the process 900 may progress to operation 914. For example, the determined theoretical processing load workload is greater than a total workload threshold set at 95% then the fusion may not occur.

In various embodiments, a threshold may be set such that a fusion may not occur if the required total processing load is greater than the threshold of the total processing load. The threshold may be set at an available total processing load, and if the required total processing load has reached (or is greater than) the threshold then the fusion may be canceled. For example, the threshold of the available total processing load is set at 95%, if the required total processing load after the fusion is 96%, then the fusion may not occur.

In operation 912, the first processing element and the second processing element are fused. For example, the fusion may include decoupling the first processing element from the first compute node, and fusing the first processing element to the second compute node. In an additional example, the fusion may include decoupling the first processing element from the first compute node, decoupling the second processing element from the second compute node, and fusing the first processing element and the second processing element to a third compute node.

In various embodiments, the fusion of the first processing element and the second processing element on the second compute node may require a stop (or, a pause) of the streams environment. For example, if the first processing element is to be migrated from a first compute node to a second compute node. The first processing element may be de-coupled from the first compute node; the tuple flow entering the first processing element may need to be paused to prevent tuples from not being processed by the first processing element before the first operator is moved to the second processing element. A pause or stop may include holding tuples from entering the first processing element or the second processing element depending on which processing element is further upstream. If the first processing element is located upstream of the second processing element, then the pause can be placed before the first processing element. If the second processing element is located upstream of the first processing element, then the pause can be placed before the second processing element. The pausing of the tuple flow may be maintained until the first processing element is de-coupled from the first compute node, and fused with the second compute node. After the first processing element is fused with the second compute node, the pause may be removed and the tuple flow may be restored.

In operation 914, the first processing element remains on the first compute node, unfused from the second compute node. If the threshold of the encryption workload has not been reached, then the processing elements remain unfused. If the processing load is greater than the processing load available, then the processing elements remain unfused.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A computer program product for managing a streaming environment, the streaming environment including at least a first processing element of a first compute node and a second processing element of a second compute node, the first processing element and second processing element being configured to process a stream of tuples, and comprising a computer readable storage medium having a computer readable program stored therein, wherein the computer readable program, when executed on a computing device, causes the computing device to:

determine that the tuple encryption operation within a first encryption layer of the first processing element and a tuple decryption operation within a second encryption layer of the second processing element are present for a transfer of the stream of tuples from the first processing element to the second processing element;

encrypt the stream of tuples using the tuple encryption operation as the stream of tuples leaves the first processing element and the stream of tuples are transferred to the second processing element;

decrypt the stream of tuples using the tuple decryption operation as the stream of tuples enters the second processing element;

measure an encryption workload of the tuple encryption operation, the encryption workload including a first processing load of the tuple encryption operation for encrypting the stream of tuples from the first processing element before sending to the second processing element;

measure a decryption workload of the decryption operation, the decryption workload including a second processing load of the tuple decryption operation on the transfer of the stream of tuples from the first processing element to the second processing element;

monitor the encryption workload and the decryption workload using an integrated development environment;

set an encryption workload threshold of the encryption operation workload of the tuple encryption operation using the first processing load of the first processing element, the encryption workload threshold including:
  measuring the first processing load of the first processing element, and
  determining that a required tuple encryption operation workload of the transfer of the stream of tuples from the first processing element to the second processing element has reached the encryption workload threshold of the first processing load of the first processing element;

fuse the first processing element to the second compute node, when the encryption workload threshold of the first processing load of the tuple encryption operation is reached, the fusing of the first processing element including:
  determining, in response to the encryption workload threshold being reached, a stop,
  stopping the stream of tuples from entering the streaming environment,
  de-coupling the first processing element from the first compute node,
  migrating the first processing element to the second compute node,
  fusing the first processing element with the second compute node,
  removing the tuple encryption operation from the first compute node, and
  removing, in response to the fusing, the stop on the stream of tuples;

set a decryption workload threshold of the decryption operation workload of the tuple decryption operation using a first processing load of the first processing element, the decryption workload threshold including:
  measuring the first processing load of the first processing element, and
  determining that a required tuple decryption operation workload of the transfer of the stream of tuples from the first processing element to the second processing element has reached the decryption workload threshold of the second processing load of the second processing element; and fuse the second processing element to the first compute node, when the decryption workload threshold of the second processing load of the tuple decryption operation is reached, the fusing of the second processing element including:
  determining, in response to the decryption workload threshold being reached, a stop,
  stopping the stream of tuples from entering the streaming environment,
  de-coupling the second processing element from the second compute node,
  migrating the second processing element to the first compute node,
  fusing the second processing element with the first compute node,
  removing the tuple decryption operation from the first compute node, and
  removing, in response to the fusing, the stop on the stream of tuples.

* * * * *